US012647049B2

(12) United States Patent
Okamoto et al.

(10) Patent No.: US 12,647,049 B2
(45) Date of Patent: Jun. 2, 2026

(54) CONTROL DEVICE FOR CONVERTER

(71) Applicant: Mitsubishi Electric Corporation, Tokyo (JP)

(72) Inventors: Takeshi Okamoto, Tokyo (JP); Hiroyuki Enokijima, Tokyo (JP); Yasushi Otsuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 170 days.

(21) Appl. No.: 18/836,862

(22) PCT Filed: Mar. 3, 2022

(86) PCT No.: PCT/JP2022/009138
§ 371 (c)(1),
(2) Date: Aug. 8, 2024

(87) PCT Pub. No.: WO2023/166662
PCT Pub. Date: Sep. 7, 2023

(65) Prior Publication Data
US 2025/0141365 A1 May 1, 2025

(51) Int. Cl.
H02M 7/5387 (2007.01)
H02M 7/219 (2006.01)
H02M 7/68 (2006.01)

(52) U.S. Cl.
CPC ....... H02M 7/53871 (2013.01); H02M 7/219 (2013.01); H02M 7/68 (2013.01)

(58) Field of Classification Search
CPC ..... H02M 7/219; H02M 7/53871; H02M 7/68
See application file for complete search history.

(56) References Cited

U.S. PATENT DOCUMENTS 5,796,228 A * 8/1998 Kojima ................... H02P 25/03
318/605
7,075,266 B2 * 7/2006 Tobari ..................... H02P 21/06
318/434
(Continued)

FOREIGN PATENT DOCUMENTS

JP 2003-339183 A 11/2003
JP 2007-159212 A 6/2007

OTHER PUBLICATIONS

International Search Report and Written Opinion mailed on May 17, 2022, received for PCT Application PCT/JP2022/009138, filed on Mar. 3, 2022, 05 pages including English Translation.

*Primary Examiner* — Yusef A Ahmed
(74) *Attorney, Agent, or Firm* — XSENSUS LLP

(57) ABSTRACT

In a control device, a phase corrector corrects an error in a phase of an AC power supply detected by a phase detector. A current coordinate transformer transforms detected values of three-phase currents of a converter into dq-axes currents using the corrected phase. A current controller calculates a voltage command so that current commands of the converter and the dq-axes currents match each other. A voltage coordinate transformer transforms the voltage command into three-phase voltage commands using the corrected phase. An estimator estimates an inductance of a reactor using the voltage commands and the dq-axes currents. The phase corrector corrects a phase detection error using the voltage commands, the dq-axes currents, and an impedance of the reactor. The current controller updates a current control gain using the inductance estimated by the estimator.

8 Claims, 13 Drawing Sheets

(56)　　　　References Cited

U.S. PATENT DOCUMENTS

| | | | | |
|---|---|---|---|---|
| 2007/0126391 A1* | 6/2007 | Tobari | ..................... | H02P 21/16 |
| | | | | 318/717 |
| 2008/0079385 A1* | 4/2008 | Hashimoto | ............. | H02P 21/18 |
| | | | | 318/801 |
| 2008/0265809 A1* | 10/2008 | Ol | ........................... | H02P 21/06 |
| | | | | 318/722 |
| 2010/0237821 A1* | 9/2010 | Kitanaka | ................. | H02P 21/05 |
| | | | | 318/702 |
| 2013/0058144 A1* | 3/2013 | Hiramatsu | .............. | H02M 7/48 |
| | | | | 363/131 |
| 2013/0279213 A1* | 10/2013 | Saeki | ................. | H02M 5/4585 |
| | | | | 363/125 |
| 2013/0279214 A1* | 10/2013 | Takase | .................... | H02M 7/68 |
| | | | | 363/37 |
| 2013/0328398 A1* | 12/2013 | Kanao | ................. | H02J 3/1814 |
| | | | | 307/23 |
| 2014/0049202 A1* | 2/2014 | Fukumaru | .............. | H02P 21/18 |
| | | | | 318/400.32 |
| 2014/0176028 A1* | 6/2014 | Tobari | ..................... | B60L 3/003 |
| | | | | 318/400.15 |
| 2015/0280612 A1* | 10/2015 | Ide | .................... | H02M 7/53871 |
| | | | | 363/98 |
| 2017/0317623 A1* | 11/2017 | Taniguchi | ................. | H02P 6/18 |
| 2019/0052210 A1* | 2/2019 | Li | ........................... | F25B 31/02 |
| 2019/0097559 A1* | 3/2019 | Li | ..................... | H02M 7/53871 |
| 2019/0386597 A1* | 12/2019 | Nishida | ................... | H02P 1/029 |
| 2020/0007058 A1* | 1/2020 | Xu | ...................... | H02P 21/0089 |
| 2020/0036316 A1* | 1/2020 | Yasumoto | .............. | H02P 27/08 |
| 2020/0119675 A1* | 4/2020 | Tanaka | .................... | B65H 7/02 |
| 2021/0281205 A1* | 9/2021 | Takagi | ................. | H02P 21/141 |
| 2022/0224266 A1* | 7/2022 | Mori | ................... | B62D 5/0463 |
| 2022/0255481 A1* | 8/2022 | Sato | ..................... | H02M 5/458 |
| 2023/0142956 A1* | 5/2023 | Yamasaki | .............. | H02P 21/13 |
| | | | | 318/400.02 |
| 2023/0208339 A1* | 6/2023 | Kanamori | ............ | H02P 27/085 |
| | | | | 318/811 |
| 2023/0299700 A1* | 9/2023 | Tobari | .................... | H02P 29/67 |
| | | | | 318/400.02 |

* cited by examiner

Fig. 6

CONTROL DEVICE FOR CONVERTER

CROSS-REFERENCE TO RELATED APPLICATION

This application is a national stage application, pursuant to 35 U.S.C. § 371, of International Patent Application No. PCT/JP2022/009138, filed Mar. 3, 2022, the entire contents of which are incorporated herein by reference.

TECHNICAL FIELD

The present disclosure relates to a control device for a converter.

BACKGROUND ART

PTL 1 discloses an example of current control of a three-phase electric motor. Even when an inductance of the three-phase electric motor changes due to magnetic saturation, a control device of the three-phase electric motor increases stability of current control by identifying the inductance and adjusting a control gain in accordance with the identified value.

CITATION LIST

Patent Literature

[PTL 1] JP 2003-339183 A

SUMMARY OF THE INVENTION

Problem to be Solved by the Invention

Current control of a three-phase PWM (Pulse Width Modulation) converter and a three-phase electric motor can be performed by similar methods. In other words, the control method described in PTL 1 can also be applied to a three-phase PWM converter. On the other hand, an inductance is calculated based on a voltage command in PTL 1. Therefore, when there is an error in a conducting phase, an error is created between the voltage command and an actual voltage and an error is also created in the calculated inductance. Accordingly, adjustment of a control gain may not be appropriately performed.

The present disclosure is related to a solution of such a problem. The present disclosure provides a control device for a converter capable of more appropriately adjusting a control gain even when there is a conducting phase error.

Means to Solve the Problem

A control device for a converter according to the present disclosure is a control device for a converter which receives an input of multi-phase currents from a multi-phase power supply and which outputs a DC (Direct Current) voltage, the control device includes: a phase detector which detects a phase of the multi-phase power supply; a phase corrector which corrects a phase detection error of the phase detector based on a voltage equation of the converter to calculate a corrected phase; a current coordinate transformer which transforms detected values of multi-phase currents of the converter to DC currents using the corrected phase; a current controller which exercises control so that current commands of the converter and the DC currents match each other to calculate a voltage command; a voltage coordinate transformer which transforms the voltage command into multi-phase voltage commands using the corrected phase; and an estimator which estimates an inductance of a reactor of the converter based on the voltage equation of the converter, the phase corrector corrects the phase detection error using the voltage command, the DC currents, and an impedance of the reactor, the estimator estimates the inductance using the voltage command and the DC currents, and the current controller updates a current control gain using the inductance estimated by the estimator.

Advantageous Effect of the Invention

With the converter control device according to the present disclosure, a control gain can be more appropriately adjusted even when there is a conducting phase error.

BRIEF DESCRIPTION OF DRAWINGS

FIG. 6 is a block diagram showing a configuration of a phase corrector of the control device according to Embodiment 1.

DESCRIPTION OF EMBODIMENTS

Modes for carrying out the object of the present disclosure will be described while referring to the accompanying drawings. The same or corresponding portions in each drawing will be denoted by the same reference signs and overlapping descriptions thereof will be simplified or omitted as deemed appropriate. It is to be understood that the object of the present disclosure is not limited to the following embodiments and any of the components of the embodiments can be modified or any of the components of the embodiments can be omitted without departing from the spirit of the present disclosure.

Embodiment 1

Figure 1:
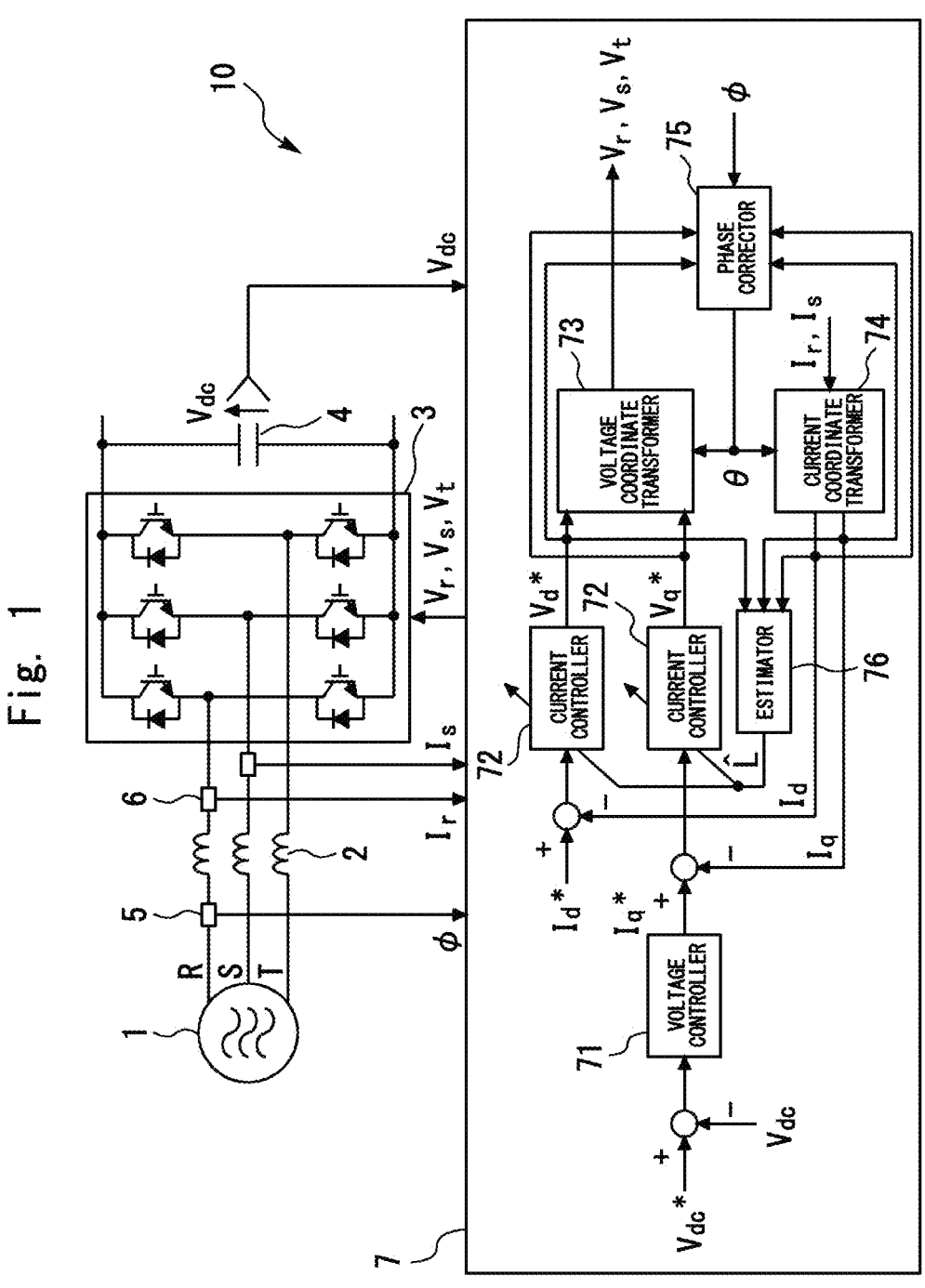
FIG. 1 is a configuration diagram of a converter and a control device thereof according to Embodiment 1.

FIG. 1 is a configuration diagram of a converter 3 and a control device 10 thereof according to Embodiment 1.

An AC (Alternating Current) power supply 1 is an example of a multi-phase power supply. In this example, the AC power supply 1 is a power supply that supplies three-phase AC power. The AC power supply 1 supplies AC power to the converter 3 which is a three-phase voltage PWM converter via a reactor 2. The converter 3 is a device which converts the AC power inputted from the AC power supply 1 into DC power and outputs the converted DC power. The converter 3 supplies the converted DC power to a smoothing capacitor 4. A DC bus voltage $V_{dc}$ is supplied from the smoothing capacitor 4 to an inverter (not illustrated) to be used to drive a load electric motor (not illustrated).

The control device 10 of the converter 3 includes a phase detector 5, a current sensor 6, and a control unit 7.

The phase detector 5 detects a phase $\phi$ of the AC power supply 1. Note that the phase detector 5 may be configured in any way regardless of being a piece of hardware or software as long as the phase of the AC power supply 1 can be detected.

The current sensor 6 detects a phase current of the converter 3. In this example, the current sensor 6 detects $I_r$ and $I_s$ as two phases of a current of the converter 3. Alternatively, the current sensor 6 may be configured to detect three phases of a current of the converter 3.

The control unit 7 calculates voltage commands $V_r$, $V_s$, and $V_t$ to the converter 3 based on the phase $\phi$ of the AC power supply 1 detected by the phase detector 5, the phase currents $I_r$ and $I_s$ of the converter 3 detected by the current sensor 6, and the DC bus voltage Vac. The control unit 7 includes a voltage controller 71, a current controller 72, a voltage coordinate transformer 73, a current coordinate transformer 74, a phase corrector 75, and an estimator 76.

The voltage controller 71 calculates a q-axis current command $I_q$* using a command value $V_{dc}$ and a detected value $V_{dc}$ of the DC bus voltage. The voltage controller 71 can use various methods such as PID (P: Proportional, I: Integral, and D: Differential) control. While a d-axis current command $I_d$* is normally set to 0 in order to achieve a power factor of 1, field-weakening control may be performed in consideration of voltage saturation.

The current controller 72 calculates command values $V_d$* and $V_q$* of dq-axes voltages using the command values $I_d$* and $I_q$* and the detected values $I_d$ and $I_q$ of the dq-axes currents. Herein, the term dq-axes may be used to represent the d-axis and the q-axis. The current controller 72 can use various methods such as PID control.

The voltage coordinate transformer 73 transforms command values of the dq-axes voltages into three-phase voltage commands $V_r$, $V_s$, and $V_t$ to the converter 3 using a corrected phase θ. In this case, the corrected phase θ is the phase $\phi$ detected by the phase detector 5 and subsequently corrected by the phase corrector 75. Details of the phase corrector 75 will be provided later. Although not illustrated in FIG. 1, the three-phase voltage commands are converted into a PWM signal by a carrier comparison and applied as a gate signal to a switching element of the converter 3.

The current coordinate transformer 74 transforms phase currents $I_r$ and $I_s$ of the converter 3 into dq-axes currents $I_d$ and $I_q$. Note that the current coordinate transformer 74 is not limited to a current coordinate transformer to which currents of two phases are inputted and may be a current coordinate transformer to which currents of three phases are inputted.

The estimator 76 estimates an inductance of the reactor 2 using the voltage command $V_d$* of the d-axis and the detected values $I_d$ and $I_q$ of the dq-axes currents. An inductance L^ estimated by the estimator 76 is outputted to the current controller 72. The current controller 72 updates a control gain using the inputted estimated value L^ of the inductance. Details of the estimator 76 will be provided later.

Figure 2:
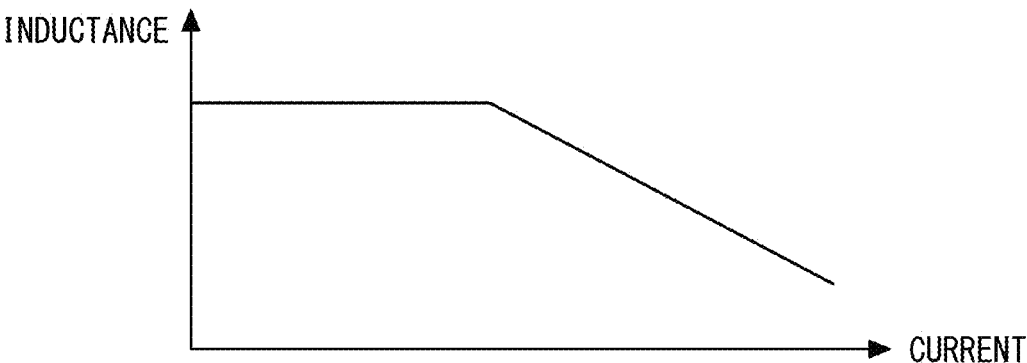
FIG. 2 is a diagram showing a relationship between a current flowing through a reactor and an inductance in the converter according to Embodiment 1.

FIG. 2 is a diagram showing a relationship between a current flowing through the reactor 2 and an inductance in the converter 3 according to Embodiment 1.

An axis of abscissa of a graph shown in FIG. 2 represents a magnitude of the current flowing through the reactor 2. An axis of ordinate of the graph shown in FIG. 2 represents a magnitude of the inductance of the reactor 2.

Since the reactor 2 is a coil, when a voltage is applied, the current flowing through the reactor 2 increases with time and magnetic flux density also increases. In other words, the greater a load connected to a DC bus, the greater the current flowing through the reactor 2 and the higher the magnetic flux density. On the other hand, the magnetic flux density does not increase ad infinitum and a state of magnetic saturation is reached when a maximum magnetic flux density determined by a material, a shape, and the like is exceeded. When magnetic saturation occurs, the inductance of the reactor 2 rapidly decreases. This situation is shown in FIG. 2.

Figure 3:
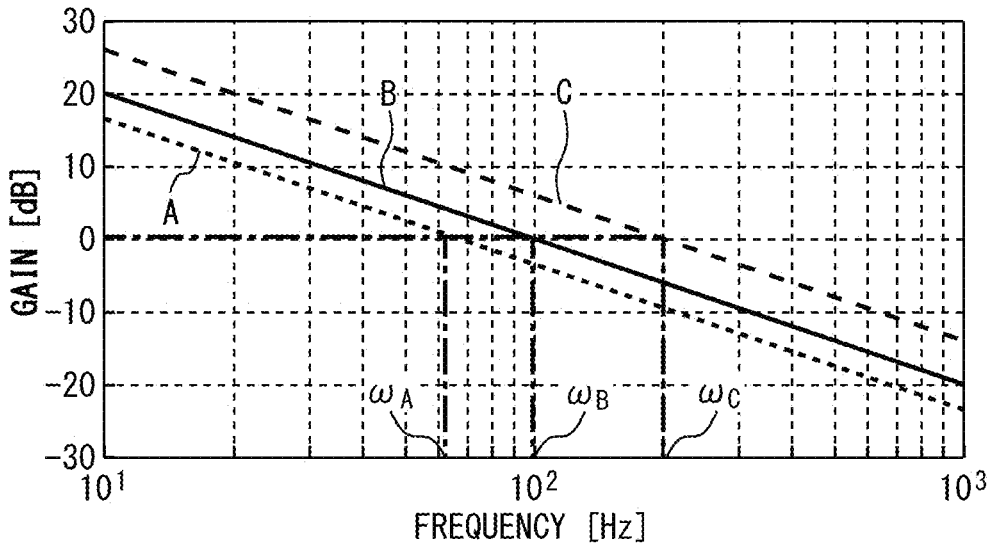
FIG. 3 is a diagram showing a change in a current control band due to a change in the inductance of the reactor in the converter according to Embodiment 1.

FIG. 3 is a diagram showing a change in a current control band due to a change in the inductance of the reactor 2 in the converter 3 according to Embodiment 1.

Usually, in the current controller 72, the current control gain is designed using a design value of the inductance of the reactor 2. When an actual inductance of the reactor 2 and a design value of the inductance of the current controller 72 match each other, open-loop characteristics of current control are as depicted by B in FIG. 3 and the current control band is $\omega_B$. When the actual inductance of the reactor 2 is greater than the design value of the inductance of the current controller 72, the current control band apparently becomes lower and the open-loop characteristics are as depicted by A in FIG. 3. At this point, the current control band is A which is lower than the design band $\omega_B$. On the other hand, when the actual inductance of the reactor 2 is smaller than the design value of the inductance of the current controller 72, the current control band apparently becomes higher and the open-loop characteristics are as depicted by C in FIG. 3. At this point, the current control band is oc which is higher than the design band $\omega_B$.

Associating these results with the relationship shown in FIG. 2 reveals that the current flowing through the reactor 2 increases when the load connected to the DC bus of the converter 3 increases and the inductance of the reactor 2 decreases due to an effect of magnetic saturation. At this point, since the actual inductance of the reactor 2 becomes smaller than the design value of the inductance of the current controller 72, the current control band apparently becomes higher. When inductance decreases and the current control band becomes higher, current controllability may decline due to vibrational responses, oscillation, or the like. The current controller 72 according to the present disclosure enables stable current control to be performed even when the inductance of the reactor 2 changes by updating a control gain using an estimated value of the inductance.

Figure 4:
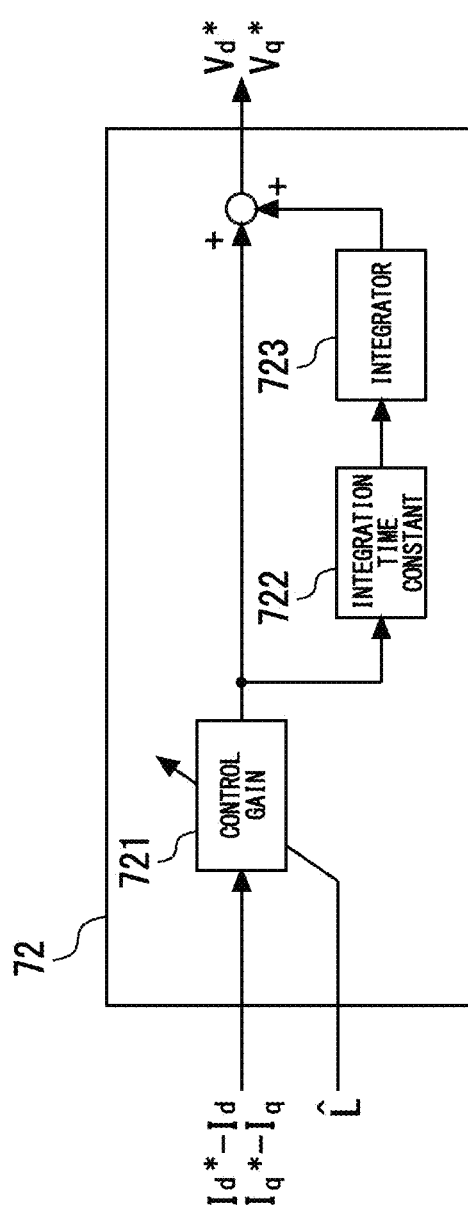
FIG. 4 is a block diagram showing a configuration of a current controller of the control device according to Embodiment 1.

FIG. 4 is a block diagram showing a configuration of the current controller 72 of the control device 10 according to Embodiment 1.

The current controller 72 updates the control gain using an estimated value of a changed inductance so as to suppress an effect of the change in inductance of the reactor 2 described earlier on stability of current control. The current controller 72 updates a control gain 721 of the current controller 72 using the inductance L^ of the reactor 2 estimated by the estimator 76. Generally, the control gain 721 of the current controller 72 is set to $\omega_c$L using a design value or of the current control band and an inductance design value L of the reactor 2. In this case, in order to update a gain using the inductance L^ of the reactor 2 estimated by the estimator 76, the gain $\omega_c$L need only be multiplied by L^/L. In other words, the control gain is updated by multiplying the gain $\phi$IL set in advance with a ratio of the estimated value L^ of the inductance by the estimator 76 to the design value L.

FIG. 4 shows an example of using PI control as current control. The current controller 72 multiplies a current deviation of the dq-axes by the control gain 721, multiplies an output of the control gain 721 by an integration time constant 722, and subsequently performs integration by an integrator 723. The current controller 72 calculates the voltage command values $V_d{}^*$ and $V_q{}^*$ of the dq-axes by adding an output of the control gain 721, that is, a proportional term, to an output of the integrator 723. In this manner, by estimating the inductance of the reactor 2 in real time and adjusting the gain, stable current control can be performed even if there is an inductance change. Note that the configuration of the current control shown in FIG. 4 is an example and the current controller 72 can use various control methods such as PID control.

Figure 5:
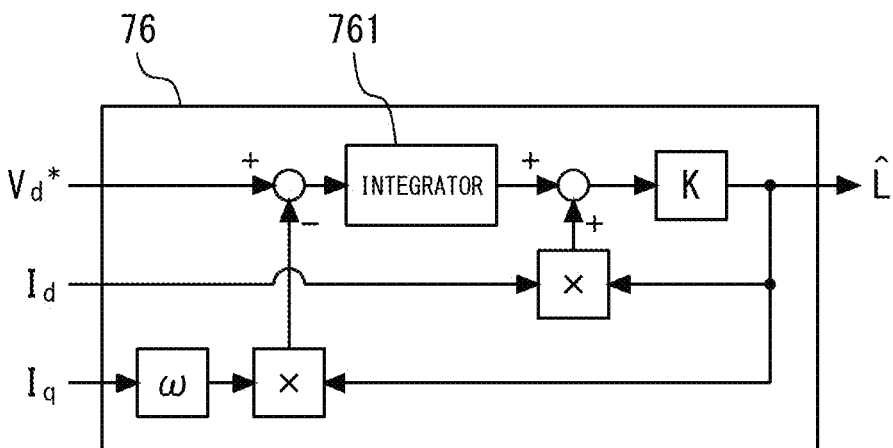
FIG. 5 is a block diagram showing a configuration of an estimator of the control device according to Embodiment 1.

FIG. 5 is a block diagram showing a configuration of the estimator 76 of the control device 10 according to Embodiment 1.

The estimator 76 is a state estimation observer which estimates an inductance of the reactor 2 using the d-axis voltage command $V_d{}^*$ and the detected values $I_d$ and $I_q$ of the dq-axes currents. In this case, a voltage equation of the d-axis of the converter 3 is represented by Expression (1) below.

[Math. 1]

$$V_d = -sLI_d + \omega LI_q \tag{1}$$

where L denotes an inductance of the reactor 2, $\omega$ denotes a frequency of the AC power supply 1, and s denotes a Laplace operator. By replacing the inductance L in Expression 1 with an estimated value L^, we get an estimated value $V_d$ ^ of the d-axis voltage as represented by Expression (2) below.

[Math. 2]

$$\hat{V}_d = -s\hat{L}I_d + \omega\hat{L}I_q \tag{2}$$

A voltage difference $ev_d$ based on Expression (1) and Expression (2) is represented by Expression (3) below.

[Math. 3]

$$e_{Vd} = V_d - \hat{V}_d = -sI_d(L - \hat{L}) + \omega I_q(L - \hat{L}) \tag{3}$$

From Expression (3), reducing a difference (L–L^) between the inductance L of the reactor 2 and the estimated value L^ thereof to zero also reduces the voltage difference $ev_d$ to zero. Therefore, the estimator 76 estimates the inductance of the reactor 2 according to a control law such as that represented by Expression (4) below.

[Math. 4]

$$\hat{L} = K \int (V_d - \hat{V}_d)dt = K \int (V_d - \omega\hat{L}I_q)dt + K\hat{L}I_d \tag{4}$$

The estimator 76 obtains the estimated value L^ of the inductance by performing integral control so that a voltage error $ev_d$ between an actual voltage $V_d$ and an estimated voltage $V_d{}^{\wedge}$ becomes zero as in Expression (4). In this case, K denotes a control gain of the estimator 76. Although the estimated value converges quickly when the control gain K is large, the control gain K is set to an appropriate value in consideration of stability of calculation. While $V_d$ in Expression (4) is the actual voltage of the converter 3, since the voltage command value $V_d{}^*$ corresponds to the actual voltage of the converter 3, the voltage $V_d$ is actually replaced with the voltage command value $V_d{}^*$. In other words, the actual converter voltage $V_d{}^*$ and the voltage command $V_d{}^*$ must match each other. While the estimator 76 which focuses on the d-axis of the converter 3 has been shown, similar inductance estimation can be performed using the voltage equation of the q-axis. In addition, the detected values $I_d$ and $I_q$ of the dq-axes currents to be inputted to the estimator 76 may be command values $I_d{}^*$ and $I_q{}^*$ of the dq-axes currents. FIG. 5 shows a block diagram of inductance estimation based on Expression (4).

Figure 6:
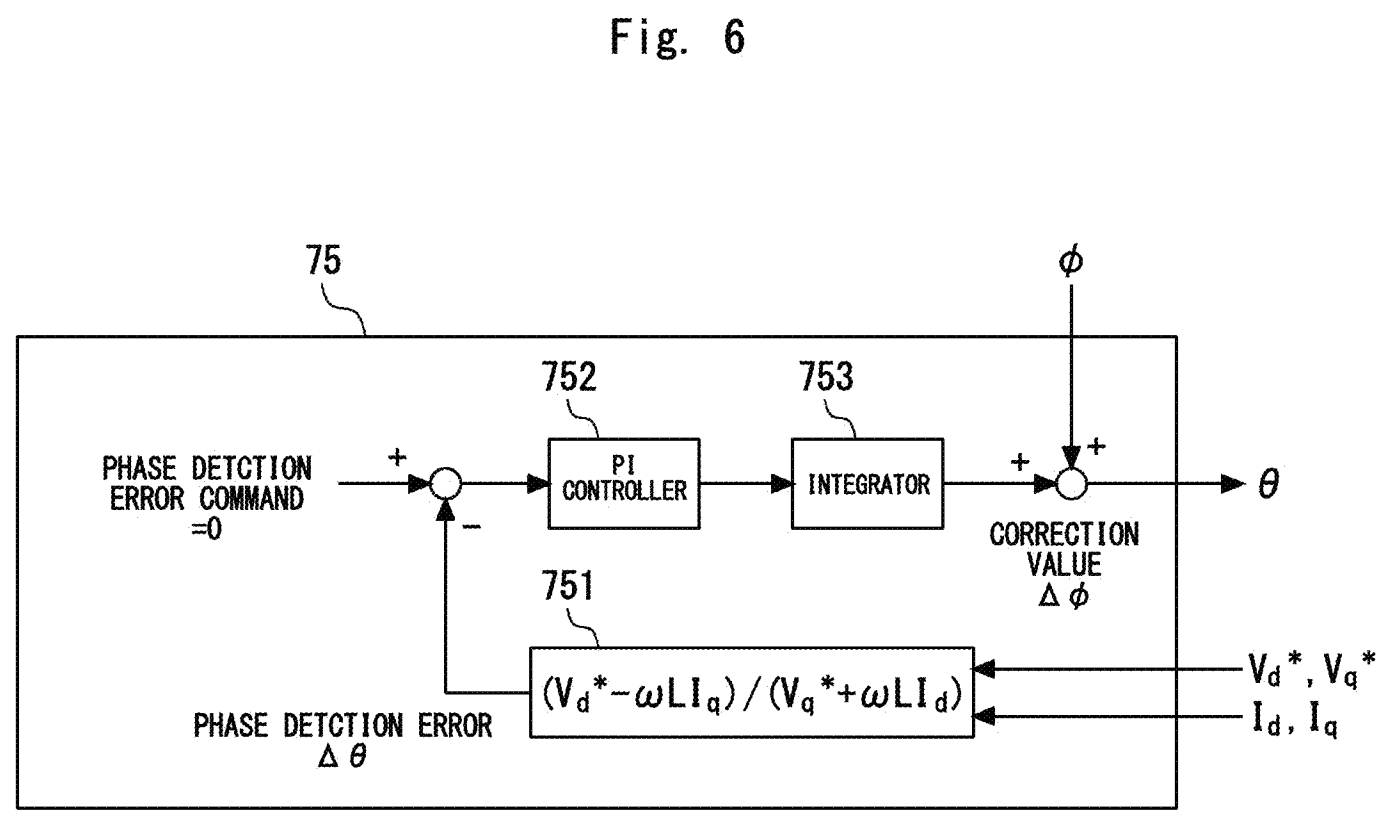

FIG. 6 is a block diagram showing a configuration of the phase corrector 75 of the control device 10 according to Embodiment 1.

A detection error may occur with respect to the phase o of the AC power supply 1 detected by the phase detector 5 depending on, for example, characteristics of a phase detection circuit, a phase calculation method, or the like. Since the estimator 76 estimates the inductance of the reactor 2 using the voltage command $V_d{}^*$ , when there is an error in the conducting phase, an error is created between the voltage command $V_d{}^*$ and the actual voltage $V_d$ and, accordingly, estimation accuracy of the estimator 76 declines. In order to suppress such a decline in estimation accuracy, the phase corrector 75 corrects the phase $\phi$ detected by the phase detector 5.

Here, an expanded induced voltage model of an electric motor is represented by E denoting an induced voltage, R denoting a winding resistance, and $\Delta\theta$ denoting a phase detection error as Expression (5) and Expression (6) below.

[Math. 5]

$$E\sin\Delta\theta = V_d - RI_d + \omega LI_q \tag{5}$$

[Math. 6]

-continued $$E\cos\Delta\theta = V_q - RI_q - \omega LI_d \qquad (6)$$

When the expressions are applied to the converter 3, E corresponds to the voltage of the AC power supply 1. $\Delta\theta$ corresponds to a detected error of the phase $\phi$ of the AC power supply 1 as detected by the phase detector 5. In addition, in the converter 3, the winding resistance R is sufficiently small and can be regarded as zero. Since a current of the converter 3 conceivably flows in an opposite direction to a current of the electric motor, by inverting the signs of the current, we get an expanded induced voltage model of the converter 3 as represented by Expression (7) and Expression (8) below.

[Math. 7]

$$E\sin\Delta\theta = V_d - \omega LI_q \qquad (7)$$

[Math. 8]

$$E\cos\Delta\theta = V_q + \omega LI_d \qquad (8)$$

From Expression (7) and Expression (8), the detected error of the phase detector 5 can be obtained as represented by Expression (9) below.

[Math. 9]

$$\Delta\theta = a\tan\frac{V_d - \omega LI_q}{V_q + \omega LI_d} \simeq \frac{V_d - \omega LI_q}{V_q + \omega LI_d} \qquad (9)$$

Expression (9) is calculated by replacing the voltages $V_d$ and $V_q$ with command values $V_d{}^*$ and $V_d{}^*$ thereof. In addition, the current values $I_d$ and $I_q$ may be replaced with command values $I_d{}^*$ and $I_q{}^*$ thereof. According to Expression (9), the phase corrector 75 can calculate the phase detection error 40 of the phase detector 5 using the voltage commands $V_d{}^*$ and $V_d{}^*$, the currents $I_d$ and $I_q$, and the impedance $\omega L$ of the reactor 2.

The phase corrector 75 may be configured to remove a high-frequency component using various filters such as a low-pass filter from the phase detection error calculated by Expression (9). The phase corrector 75 calculates the phase detection error $\Delta\theta$ using Expression (9) and, for example, obtains a phase correction value $\Delta\phi$ as follows by PLL (Phase Locked Loop) control. The phase corrector 75 obtains a correction rate by controlling a difference between a phase detection error command=0 and the phase detection error=$\Delta$74 with a PI controller 752. The phase corrector 75 obtains the phase correction value Ap by integrating the correction rate with an integrator 753. The phase corrector 75 adds the obtained phase correction value Ao to the phase o to calculate a corrected phase 0. By constructing such a PLL control loop, a detected error of the phase $\phi$ of the AC power supply 1 as detected by the phase detector 5 can be corrected and a conducting phase can be improved, and a voltage command and an actual voltage can be made to match each other. Accordingly, a decline in estimation accuracy of inductance by the estimator 76 can be suppressed.

Note that the phase corrector 75 which performs correction according to Expression (9) requires the inductance L of the reactor 2. Therefore, a case where a detection error of a phase detected value $\phi$ has occurred and a case where the inductance L changes even though a detection error of the phase detected value $\phi$ has not occurred are not separated from each other and, in both cases, a calculation is performed assuming that the phase detection error $\Delta\theta$ has been created in the phase detector 5. According to the relationship shown in FIG. 2, when a current flowing through the reactor 2 increases, the inductance of the reactor 2 decreases due to the effect of magnetic saturation. On the other hand, the inductance of the reactor 2 remains unchanged when the current flowing through the reactor 2 is small. Based on this relationship between current and inductance, the control unit 7 suppresses an effect of a change in the inductance L being calculated as the phase detection error $\Delta\theta$ by switching among operations according to the magnitude of a current. When the current is smaller than a reference value, the phase corrector 75 corrects or learns a phase error. Specifically, the phase corrector 75 calculates a phase correction value based on Expression (9) and the like and corrects the conducting phase using the calculated phase correction value. At this point, the estimator 76 does not estimate the inductance. For example, the estimator 76 may output a design value of the inductance or output an immediately-preceding estimated value. On the other hand, when the current is equal to or larger than the reference value, the phase corrector 75 corrects the conducting phase using the phase correction value calculated when the current has been smaller than the reference value. At this point, the estimator 76 estimates the inductance using a voltage command calculated based on the corrected energizing phase, a current value, and the like. Note that the reference value is a current threshold set in advance according to, for example, a current value at which magnetic saturation occurs in the reactor 2 and the like. A current value that is compared with the reference value is, for example, dq-axes currents $I_d$ and $I_q$ or the like.

Figure 7:
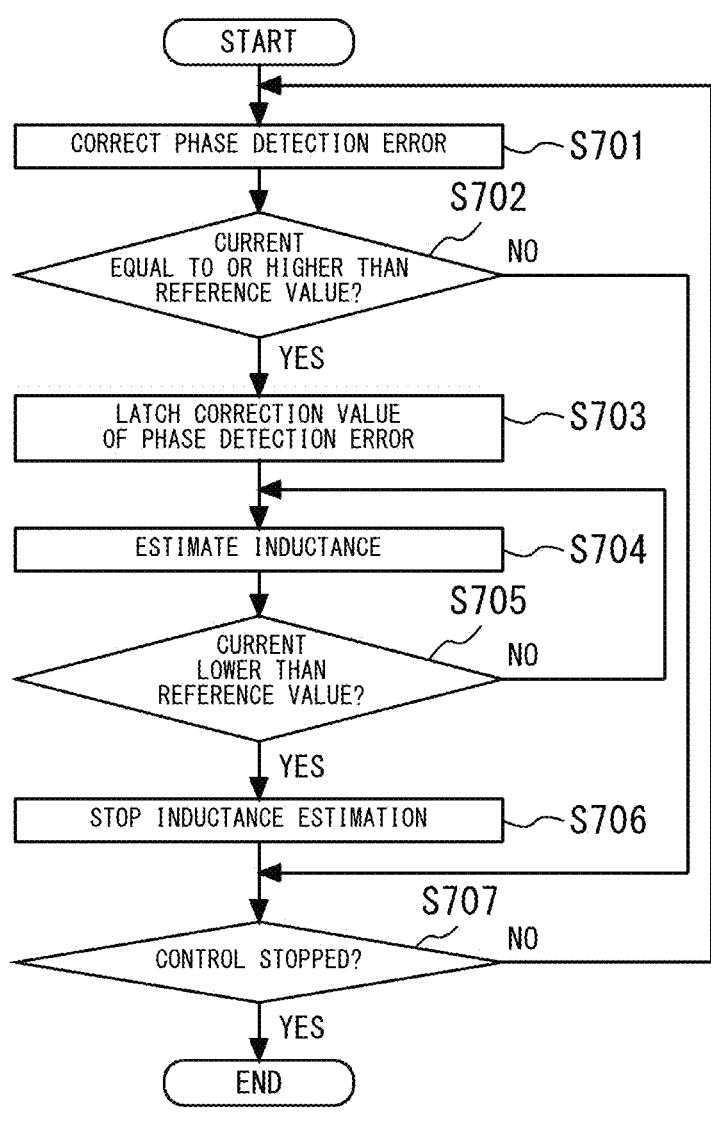
FIG. 7 is a flowchart showing an example of operations of the control device according to Embodiment 1.

FIG. 7 is a flowchart showing an example of operations of the control device 10 according to Embodiment 1.

FIG. 7 shows an example of processing in phase correction and inductance estimation. The processing shown in FIG. 7 is performed when, for example, starting control of the converter 3.

In step S701, the phase corrector 75 corrects a phase detection error of the phase detector 5 according to a configuration such as that shown in the block diagram of FIG. 6. Subsequently, the processing of the control device 10 advances to step S702.

In step S702, the control unit 7 determines whether or not a current value of the converter 3 is equal to or higher than a reference value. When the current value is equal to or higher than the reference value, assuming that the inductance of the reactor 2 changes, the processing of the control device 10 advances to step S703. On the other hand, when the current value is lower than the reference value, assuming that the inductance of the reactor 2 does not change, the processing of the control device 10 advances to step S707 without performing estimation of the inductance by the estimator 76.

In step S703, since the inductance changes, the phase corrector 75 latches the correction value $\Delta\phi$ of the phase detection error. Accordingly, a change in the correction value $\Delta\phi$ through Expression (9) due to a change in inductance can be suppressed. For example, the phase corrector 75 latches an output of the integrator 753 shown in FIG. 6. Due to latching of the correction value $\Delta\phi$, the phase detection error of the phase detector 5 is corrected without being affected by a change in inductance. Subsequently, the processing of the control device 10 advances to step S704.

In step S704, the estimator 76 estimates the inductance of the reactor 2 according to a configuration such as that shown in the block diagram of FIG. 5. Subsequently, the processing of the control device 10 advances to step S705.

In step S705, the control unit 7 determines whether or not a current value of the converter 3 is lower than the reference value. When the current value is equal to or higher than the reference value, assuming that the inductance of the reactor 2 changes, the processing of the control device 10 advances to step S704 so as to continue estimation of the inductance. On the other hand, when the current value is lower than the reference value, assuming that the inductance of the reactor 2 does not change, the processing of the control device 10 advances to step S706.

In step S706, the estimator 76 stops the estimation of the inductance of the reactor 2. At this point, since a change in the inductance of the reactor 2 has not occurred, the output of an integrator 761 of the estimator 76 may be reset to an initial value or, in other words, a design value. Subsequently, the processing of the control device 10 advances to step S707.

In step S707, the control unit 7 determines whether or not control of the converter 3 has stopped. When the control of the converter 3 has not stopped, the processing of the control device 10 advances to step S701 so as to correct a phase detection error. On the other hand, when the control of the converter 3 has stopped, the processing of the control device 10 ends.

Figure 8:
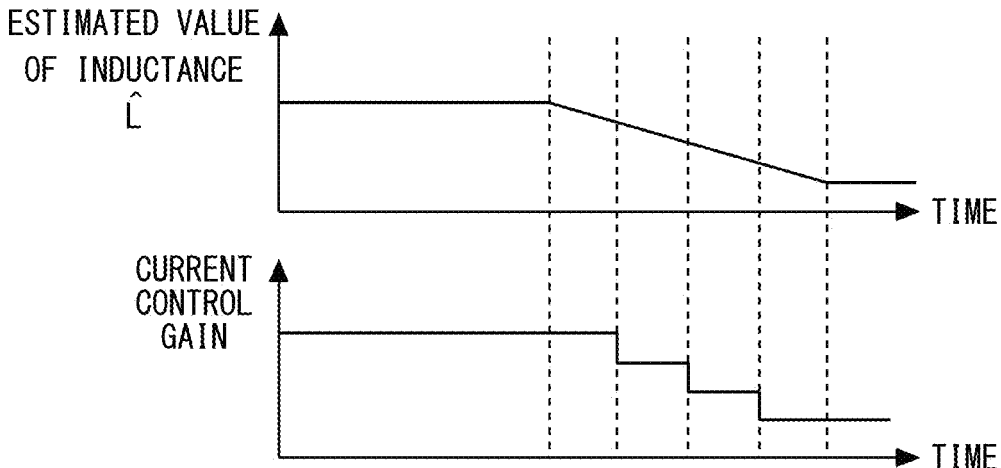
FIG. 8 is a diagram showing an example of a correspondence between an estimated value of the inductance and a current control gain in the control device according to Embodiment 1.
Figure 9:
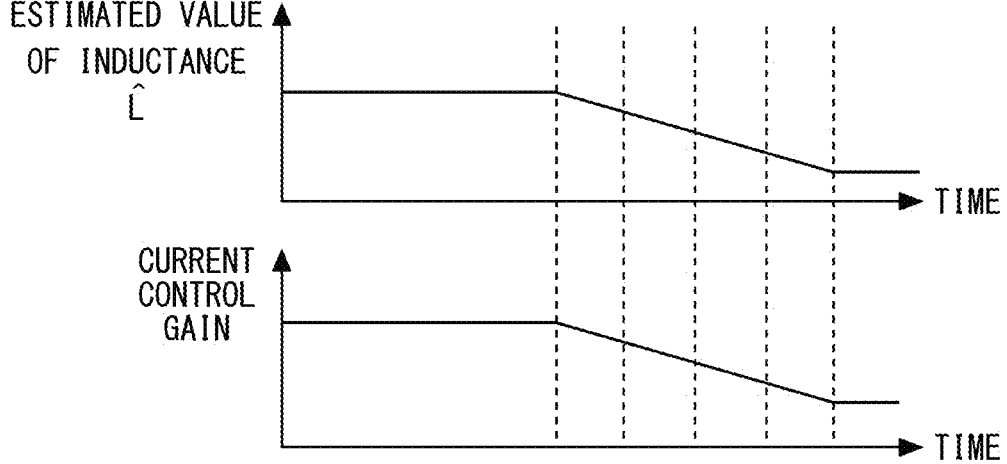
FIG. 9 is a diagram showing an example of a correspondence between an estimated value of the inductance and a current control gain in the control device according to Embodiment 1.

FIGS. 8 and 9 are diagrams showing an example of a correspondence between an estimated value of the inductance and a current control gain in the control device 10 according to Embodiment 1.

Axes of abscissa of an upper graph and a lower graph shown in FIGS. 8 and 9 represent the passage of time. An axis of ordinate of the upper graph shown in FIGS. 8 and 9 represents an estimated value of the inductance of the reactor 2. An axis of ordinate of the lower graph shown in FIGS. 8 and 9 represents a current control gain set in the current controller 72 according to the estimated value of the inductance. FIGS. 8 and 9 show a situation where the estimated value of the inductance decreases due to magnetic saturation.

FIG. 8 shows an example of a system in which the current control gain is updated in stages according to the estimated value of the inductance. For example, this system is adopted in a case of a design where the current control gain set to the current controller 72 is given more leeway with respect to stability of a control system or the like.

FIG. 9 shows an example of a system in which the current control gain is continuously updated according to the estimated value of the inductance. For example, this system is adopted in a case of a design where the current control gain set to the current controller 72 is given less leeway with respect to stability of a control system or, in other words, a case of a design of high gain in order to suppress current pulsation or pulsation of a bus voltage, or the like. Continuously changing the control gain further improves stability of control.

As described above, the control device 10 according to Embodiment 1 is a control device of the converter 3. The converter 3 receives an input of three-phase currents from the AC power supply 1, performs switching, and outputs a DC voltage. The control device 10 includes the phase detector 5, the phase corrector 75, the current coordinate transformer 74, the current controller 72, the voltage coordinate transformer 73, and the estimator 76. The phase detector 5 detects a phase of the AC power supply 1. The phase corrector 75 corrects a phase detection error of the phase detector 5 based on a voltage equation of the converter 3 to calculate a corrected phase. The current coordinate transformer 74 transforms detected values of the three-phase currents of the converter 3 to dq-axes currents using the corrected phase. The current controller 72 exercises control so that current commands of the converter 3 and the dq-axes currents converted by the current coordinate transformer 74 match each other to calculate a voltage command. The voltage coordinate transformer 73 transforms the voltage command into three-phase voltage commands using the corrected phase. The estimator 76 estimates an inductance of the reactor 2 of the converter 3 based on a voltage equation of the converter 3. The phase corrector 75 corrects a phase detection error using the voltage commands calculated by the current controller 72, the dq-axes currents transformed by the current coordinate transformer 74, and an impedance of the reactor 2 estimated by the estimator 76. The estimator 76 estimates an inductance using the voltage commands calculated by the current controller 72 and the dq-axes currents transformed by the current coordinate transformer 74. The current controller 72 updates a current control gain using the inductance estimated by the estimator 76.

According to such a configuration, estimation of an inductance is performed in a state where an error of a conducting phase has been corrected. Accordingly, accuracy of estimation of the inductance is further increased and, due to an improvement in a current control band, stability of current control is further increased. Therefore, a control gain can be more appropriately adjusted even when there is a conducting phase error.

In addition, when the dq-axes currents transformed by the current coordinate transformer 74 are smaller than a reference value, the estimator 76 stops estimation of the inductance. When the dq-axes currents transformed by the current coordinate transformer 74 are equal to or larger than the reference value, the phase corrector 75 latches a correction value of a phase detection error. When the dq-axes currents transformed by the current coordinate transformer 74 are equal to or larger than the reference value, the estimator 76 estimates an inductance with voltage commands calculated using the latched correction value and the converted dq-axes currents.

According to such a configuration, a conducting phase is corrected under conditions where a change in inductance of the reactor 2 does not occur. In this case, since the estimation of the inductance is stopped, the conducting phase is corrected in an effective manner. In addition, since a phase correction value is latched and inductance estimation is performed under conditions where a change in inductance of the reactor 2 occurs, the inductance is accurately estimated. As described above, since correction of a conducting phase, estimation of the inductance, and the like are switched according to conditions such as a presence or absence of occurrence of a change in inductance, a stabler current control system is provided even when an inductance change may occur.

Furthermore, the phase corrector 75 calculates a corrected phase by performing feedback control so that the phase detection error of the phase detector 5 becomes zero. The phase detection error of the phase detector is calculated using the voltage commands calculated by the current controller 72, the dq-axes currents transformed by the current coordinate transformer 74, and an impedance of the reactor 2.

In addition, based on the voltage equation of the converter 3, the estimator 76 estimates an inductance according to a state estimation observer to which the voltage commands calculated by the current controller 72 and the dq-axes currents transformed by the current coordinate transformer 74 are input.

In addition, the current controller 72 may update a current control gain in stages using the inductance estimated by the estimator 76. In this case, processing of updating a control gain according to an estimated value of the inductance becomes simpler.

Alternatively, the current controller 72 may continuously update the current control gain using the inductance estimated by the estimator 76. Continuously changing the control gain further improves stability of control.

Next, an example of a hardware configuration of the control device 10 will be described with reference to FIG. 10.

Figure 10:
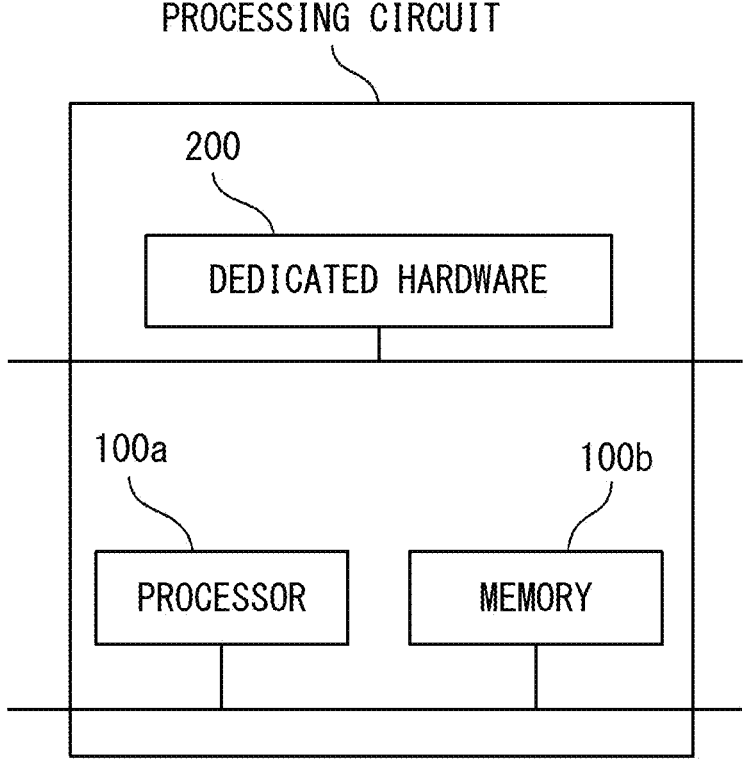
FIG. 10 is a hardware configuration diagram of substantial parts of the control device according to Embodiment 1.

FIG. 10 is a hardware configuration diagram of substantial parts of the control device 10 according to Embodiment 1.

Each function of the control device 10 can be realized by a processing circuit. The processing circuit includes at least one processor 100a and at least one memory 100b. The processing circuit may include at least one piece of dedicated hardware 200 together with, or in place of, the processor 100a and the memory 100b.

When the processing circuit includes the processor 100a and the memory 100b, each function of the control device 10 is realized by software, firmware, or a combination of software and firmware. At least one of the software and the firmware is described as a program. The program is stored in the memory 100b. The processor 100a realizes each function of the control device 10 by reading and executing the program stored in the memory 100b.

The processor 100a is also referred to as a CPU (Central Processing Unit), a processing unit, an arithmetic unit, a microprocessor, a microcomputer, or a DSP. The memory 100b is constituted of, for example, a non-volatile or volatile semiconductor memory such as a RAM, a ROM, a flash memory, an EPROM, or an EEPROM.

When the processing circuit includes the piece of dedicated hardware 200, for example, the processing circuit is realized by a single circuit, a combined circuit, a programmed processor, a parallel-programmed processor, an ASIC, an FPGA, or a combination thereof.

Each function of the control device 10 can be individually realized by a processing circuit. Alternatively, respective functions of the control device 10 can be collectively realized by a processing circuit. With respect to the respective functions of the control device 10, a part of the functions may be realized by the piece of dedicated hardware 200 while other parts may be realized by software or firmware. In this manner, the processing circuit realizes each function of the control device 10 using the dedicated hardware 200, software, firmware, or a combination thereof.

Embodiment 2

In Embodiment 2, points which differ from the example disclosed in Embodiment 1 will be described in detail. Any of the features of the example disclosed in Embodiment 1 may be adopted as features not described in Embodiment 2.

The control device 10 according to Embodiment 1 stabilizes current control by estimating an inductance of the reactor 2 and updating a gain of the current controller 72 based on the estimated inductance. Embodiment 2 discloses an example of the control device 10 which is capable of further increasing stability of the current controller 72 by monitoring an estimated value of the inductance.

Figure 11:
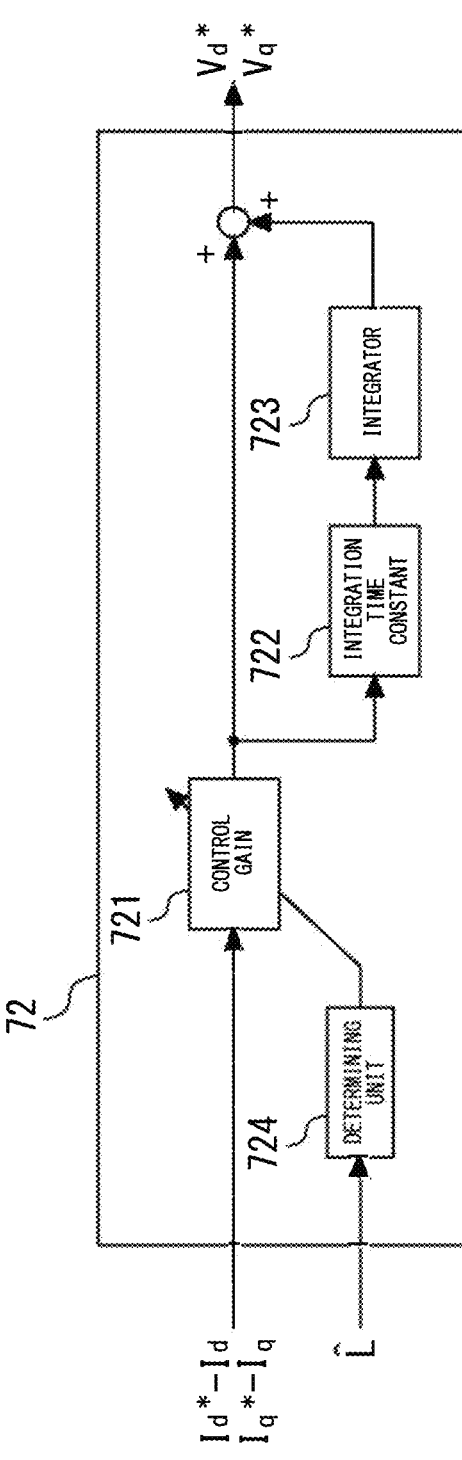
FIG. 11 is a block diagram showing a configuration of the current controller of the control device according to Embodiment 2.

FIG. 11 is a block diagram showing a configuration of the current controller 72 of the control device 10 according to Embodiment 2.

The control device 10 according to Embodiment 2 is the same as the control device 10 according to Embodiment 1 with the exception of a configuration of the current controller 72. Compared to the current controller 72 of the control device 10 according to Embodiment 1, the current controller 72 of the control device 10 according to Embodiment 2 further includes a determining unit 724.

The determining unit 724 is a portion equipped with a function of monitoring an estimated value of the inductance of the reactor 2 as estimated by the estimator 76 and determining whether or not the estimated value is abnormal. For example, the determining unit 724 determines whether or not an estimated value $L^{\wedge}$ of the inductance deviates from a range set in advance. At this point, the determining unit 724 stores a maximum value $L_{max}$ and a minimum value $L_{min}$ of the inductance set in advance. The determining unit 724 determines whether or not the inductance $L^{\wedge}$ estimated by the estimator 76 satisfies a condition expressed as $L_{min} < L^{\wedge} < L_{max}$. When the condition expressed as $L_{min} < L^{\wedge} < L_{max}$ is satisfied, the determining unit 724 determines that the estimated value of the inductance is normal. At this point, the current controller 72 updates the control gain 721 using the estimated value of the inductance having been determined to be normal. On the other hand, when the condition expressed as $L_{min} < L^{\wedge} < L_{max}$ is not satisfied, the determining unit 724 determines that the estimated value of the inductance is abnormal. In this case, the current controller 72 does not update the control gain 721. When the current controller 72 does not update the control gain 721, the current controller 72 may maintain the value of the control gain 721 immediately previously updated using the estimated value of the inductance having been determined to be normal.

The determining unit 724 may monitor a change over time of the estimated value $L^{\wedge}$ of the inductance. For example, the determining unit 724 calculates an amount of a change over time $dL^{\wedge}/dt$ of $L^{\wedge}$ for each current control period and compares the calculated amount of a change over time with a reference value set in advance. When the calculated amount of a change over time does not exceed the reference value, the determining unit 724 determines that the estimated value of the inductance is normal. At this point, the current controller 72 updates the control gain 721 using the estimated value of the inductance having been determined to be normal. On the other hand, when the calculated amount of a change over time exceeds the reference value, the determining unit 724 determines that the estimated value of the inductance is abnormal. In this case, the current controller 72 does not update the control gain 721.

In addition, since the inductance changes according to current, the determining unit 724 may monitor a current change of the estimated value $L^{\wedge}$ of the inductance. For example, the determining unit 724 calculates an amount of current change $dL^{\wedge}/dl$ of $L^{\wedge}$ for each current control period and compares the calculated amount of current change with a reference value set in advance. When the calculated amount of current change does not exceed the reference value, the determining unit 724 determines that the estimated value of the inductance is normal. At this point, the current controller 72 updates the control gain 721 using the estimated value of the inductance having been determined to be normal. On the other hand, when the calculated amount of current change exceeds the reference value, the determining unit 724 determines that the estimated value of the inductance is abnormal. In this case, the current controller 72 does not update the control gain 721.

Figure 12:
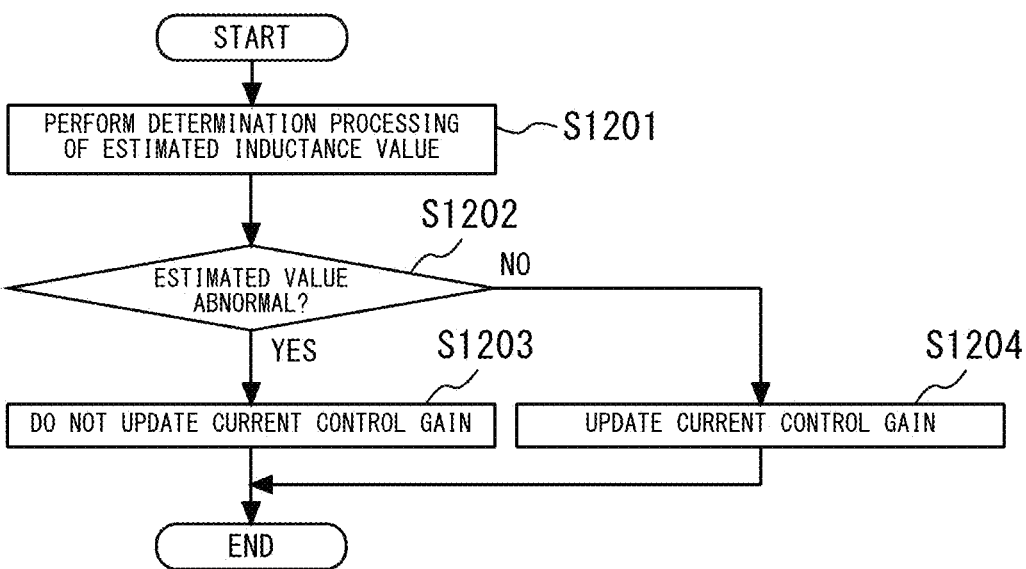
FIG. 12 is a flowchart showing an example of operations of the control device according to Embodiment 2.

FIG. 12 is a flowchart showing an example of operations of the control device 10 according to Embodiment 2.

FIG. 12 shows an example of processing in monitoring of an estimated value of the inductance.

In step S1201, the determining unit 724 performs processing for determining whether or not an estimated value of the inductance which is estimated by the estimator 76 is abnormal. The determination of whether or not the estimated value of the inductance is abnormal is performed based on, for example, a magnitude of the estimated value itself, a magnitude of an amount of a change over time of the estimated value, a magnitude of an amount of a current change of the estimated value, or the like. At this point, the determining unit 724 performs processing such as reading of the estimated value by the estimator 76, calculation of an amount of a change over time, calculation of an amount of a current change, or the like. Subsequently, the processing of the control device 10 advances to step S1202.

In step S1202, the determining unit 724 determines whether or not the estimated value of the inductance is abnormal. When the estimated value of the inductance is determined to be abnormal, the processing of the control device 10 advances to step S1203. On the other hand, when the estimated value of the inductance is determined to be not abnormal, the processing of the control device 10 advances to step S1204.

In step S1203, since the estimated value of the inductance is abnormal, the current controller 72 ends the processing of the control device 10 without updating the control gain 721. At this point, there is a possibility that a current, a voltage, or the like that is an input signal to the estimator 76 also has an abnormal value. Therefore, the control device 10 may be configured to stop control of the converter 3 itself when the estimated value of the inductance is abnormal.

In step S1204, since the estimated value of the inductance is normal, the current controller 72 updates the control gain 721 using the estimated value of the inductance. Subsequently, the processing of the control device 10 ends.

As described above, in the control device 10 according to Embodiment 2, the presence or absence of an abnormality is determined by monitoring the inductance estimated by the estimator 76. When the presence of an abnormality is determined, the current controller 72 does not update the current control gain.

Due to such a configuration, since the control gain is prevented from being updated to an abnormal value, a stabler current control system is provided.

Embodiment 3

In Embodiment 3, points which differ from the examples disclosed in Embodiment 1 and Embodiment 2 will be described in detail. Any of the features of the examples disclosed in Embodiment 1 and Embodiment 2 may be adopted as features not described in Embodiment 3.

Embodiment 3 provides an example of the control device 10 which is capable of further increasing stability of the current controller 72 by monitoring a phase correction value of the phase corrector 75.

Figure 13:
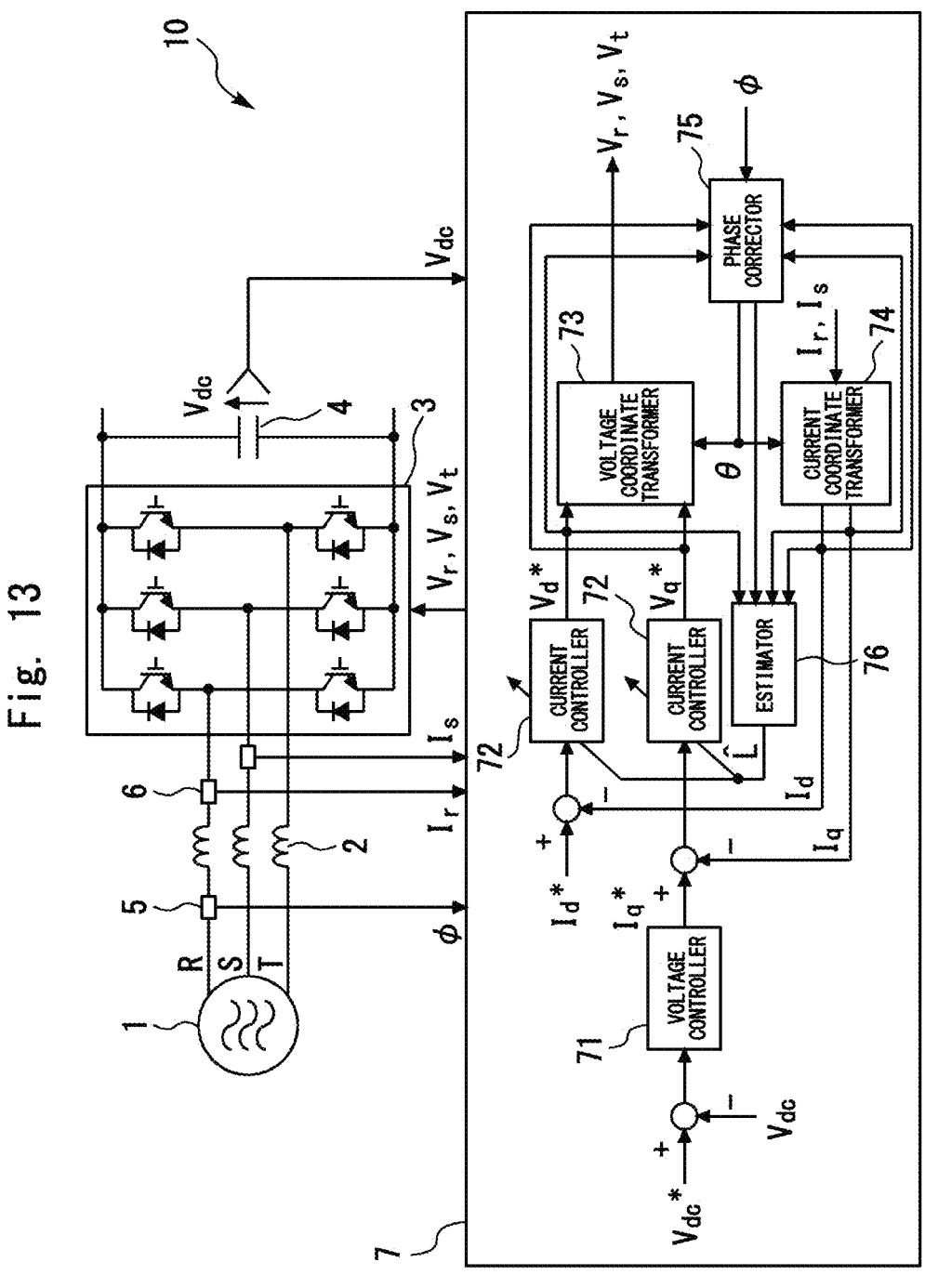
FIG. 13 is a configuration diagram of the converter and the control device thereof according to Embodiment 3.

FIG. 13 is a configuration diagram of the converter 3 and the control device 10 thereof according to Embodiment 3.

In the control unit 7 of the control device 10 according to Embodiment 3, a signal line from the phase corrector 75 to the estimator 76 has been added as compared to the control device 10 according to Embodiment 1. In the control device 10 according to this example, the phase corrector 75 monitors a phase correction value and notifies a propriety of an estimation of the inductance to the estimator 76 based on a result of the monitoring. The estimator 76 switches operations based on the propriety of estimation of the inductance notified from the phase corrector 75. The estimator 76 performs an estimation of the inductance when a notification that an estimation of the inductance is possible is received from the phase corrector 75. Note that the estimator 76 need not estimate the inductance regardless of contents of the notification from the phase corrector 75 in a situation where, for example, an estimation of the inductance is not performed regardless of a presence or absence of an abnormality such as when a current of the converter 3 is small. The estimator 76 does not perform an estimation of the inductance when a notification that an estimation of the inductance is not possible is received from the phase corrector 75.

Figure 14:
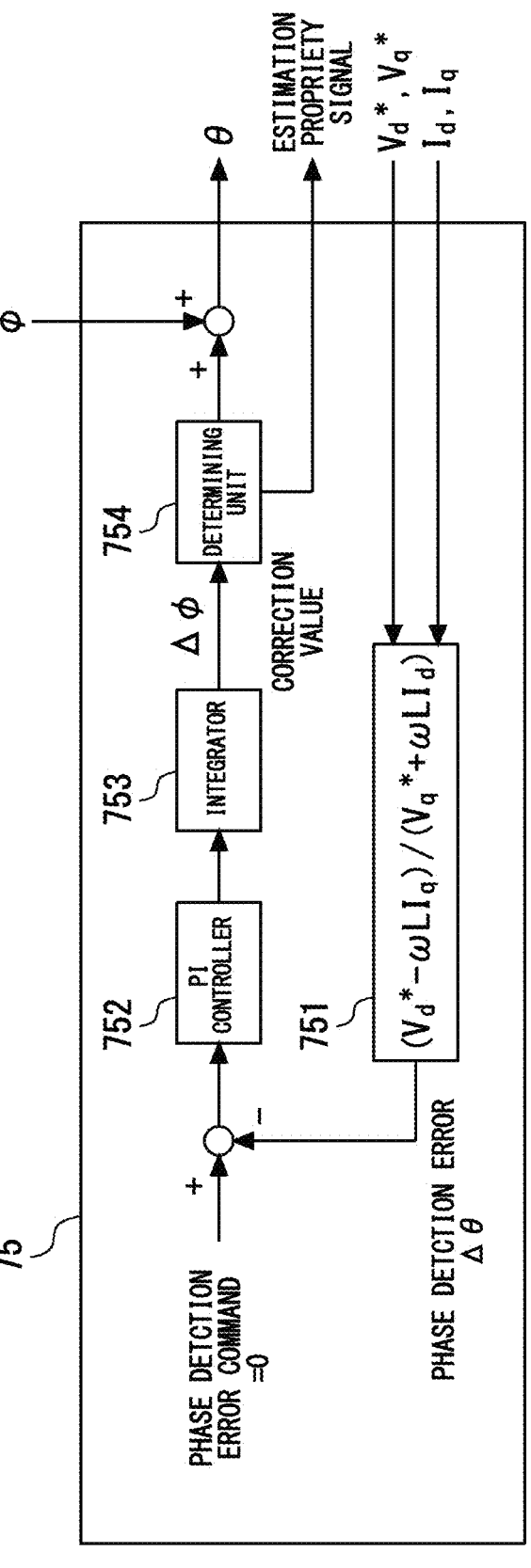
FIG. 14 is a block diagram showing a configuration of the phase corrector of the control device according to Embodiment 3.

FIG. 14 is a block diagram showing a configuration of the phase corrector 75 of the control device 10 according to Embodiment 3.

Compared to the phase corrector 75 of the control device 10 according to Embodiment 1, the phase corrector 75 of the control device 10 according to Embodiment 3 further includes a determining unit 754.

The determining unit 754 is a portion equipped with a function of monitoring a phase correction value calculated by the phase corrector 75 and determining whether or not the phase correction value is abnormal. For example, the determining unit 754 determines whether or not the phase correction value $\Delta\phi$ deviates from a range set in advance. At this point, the determining unit 754 stores a maximum value $\Delta\phi_{max}$ and a minimum value $\Delta\phi_{min}$ of the phase correction value set in advance. The determining unit 754 determines whether or not the phase correction value $\Delta\phi$ which is an output of the integrator 753 satisfies a condition expressed as $\Delta\phi_{min}<\Delta\phi<\Delta\phi_{max}$. When the condition expressed as $\Delta\phi_{min}<\Delta\phi<\Delta\phi_{max}$ is satisfied, the determining unit 754 determines that the phase correction value is normal. At this point, the phase corrector 75 transmits a notification that an estimation of the inductance is possible to the estimator 76. On the other hand, when the condition expressed as $\Delta\phi_{min}<\Delta\phi<\Delta\phi_{max}$ is not satisfied, the determining unit 754 determines that the phase correction value is abnormal. At this point, the phase corrector 75 transmits a notification that an estimation of the inductance is not possible to the estimator 76.

The determining unit 754 may monitor a change over time of the phase correction value $\Delta\phi$. For example, the determining unit 754 calculates an amount of a change over time $d\Delta\phi/dt$ of $\Delta\phi$ for each current control period and compares the calculated amount of a change over time with a reference value set in advance. When the calculated amount of a change over time does not exceed the reference value, the determining unit 724 determines that the phase correction value is normal. At this point, the phase corrector 75 transmits a notification that an estimation of the inductance is possible to the estimator 76. On the other hand, when the calculated amount of a change over time exceeds the reference value, the determining unit 754 determines that the phase correction value is abnormal. At this point, the phase corrector 75 transmits a notification that an estimation of the inductance is not possible to the estimator 76.

Figure 15:
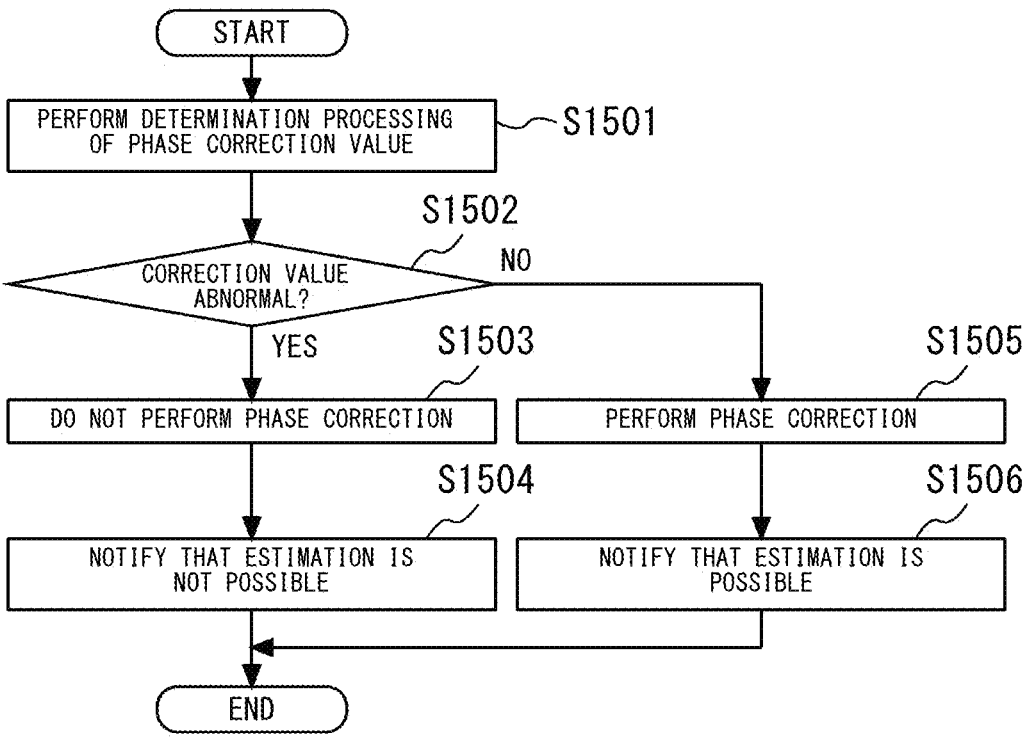
FIG. 15 is a flowchart showing an example of operations of the control device according to Embodiment 3.

FIG. 15 is a flowchart showing an example of operations of the control device 10 according to Embodiment 3.

FIG. 15 shows an example of processing in monitoring of a phase correction value.

In step S1501, the determining unit 754 performs processing for determining whether or not a phase correction value which is calculated by the phase corrector 75 is abnormal. The determination of whether or not the phase correction value is abnormal is performed based on, for example, a magnitude of the phase correction value itself, a magnitude of an amount of a change over time of the phase correction value, or the like. At this point, the determining unit 754 performs processing such as reading of the calculated phase correction value, calculation of an amount of a change over time, or the like. Subsequently, the processing of the control device 10 advances to step S1502.

In step S1502, the determining unit 754 determines whether or not the phase correction value is abnormal. When the phase correction value is determined to be abnormal, the processing of the control device 10 advances to step S1503. On the other hand, when the phase correction value is determined to be not abnormal, the processing of the control device 10 advances to step S1505.

In step S1503, since the phase correction value is abnormal, the phase corrector 75 does not correct a phase. Subsequently, the processing of the control device 10 advances to step S1504. When the phase correction value is abnormal, there is a possibility that a current, a voltage, or the like that is an input signal to the phase corrector 75 also has an abnormal value. Therefore, the control device 10 may be configured to stop control of the converter 3 itself when the phase correction value is abnormal.

In step S1504, the phase corrector 75 transmits a notification that an estimation of the inductance is not possible to the estimator 76. Subsequently, the processing of the control device 10 ends.

In step S1505, since the phase correction value is normal, the phase corrector 75 corrects a phase using the correction value. Subsequently, the processing of the control device 10 advances to step S1506.

In step S1506, the phase corrector 75 transmits a notification that an estimation of the inductance is possible to the estimator 76. Subsequently, the processing of the control device 10 ends.

As described above, in the control device 10 according to Embodiment 3, the presence or absence of an abnormality is determined by monitoring a correction value of the phase detection error calculated by the phase corrector 75. When the presence of an abnormality is determined, the phase corrector 75 does not correct a phase detected by the phase detector 5. In this case, the estimator 76 does not estimate an inductance.

Due to such a configuration, since an abnormal value of the inductance is prevented from being estimated, a stabler current control system is provided.

INDUSTRIAL APPLICABILITY

The control device according to the present disclosure can be applied to control of a converter.

REFERENCE SIGNS LIST

1 AC power supply, 2 Reactor, 3 Converter, 4 Smoothing capacitor, 5 Phase detector, 6 Current sensor, 7 Control unit, 10 Control device, 71 Voltage controller, 72 Current controller, 73 Voltage coordinate transformer, 74 Current coordinate transformer, 75 Phase corrector, 76 Estimator, 100a Processor, 100b Memory, 200 Dedicated hardware

The invention claimed is:

1. A control device for a converter which receives an input of multi-phase currents from a multi-phase power supply and which outputs a DC (Direct Current) voltage, the control device comprising:
- a phase detector which detects a phase of the multi-phase power supply;
- a phase corrector which corrects a phase detection error of the phase detector based on a voltage equation of the converter to calculate a corrected phase;
- a current coordinate transformer which transforms detected values of multi-phase currents of the converter to DC currents using the corrected phase;
- a current controller which exercises control so that current commands of the converter and the DC currents match each other to calculate a voltage command;
- a voltage coordinate transformer which transforms the voltage command into multi-phase voltage commands using the corrected phase; and
- an estimator which estimates an inductance of a reactor of the converter based on the voltage equation of the converter, wherein
- the phase corrector corrects the phase detection error using the voltage command, the DC currents, and an impedance of the reactor,
- the estimator estimates the inductance using the voltage command and the DC currents, and
- the current controller updates a current control gain using the inductance estimated by the estimator.

2. The control device for the converter according to claim 1, wherein when the DC currents are smaller than a reference value, the estimator stops estimation of the inductance,
- when the DC currents are equal to or larger than the reference value, the phase corrector latches a correction value of the phase detection error, and
- when the DC currents are equal to or larger than the reference value, the estimator estimates the inductance with the voltage command calculated using the latched correction value and the DC currents.

3. The control device for the converter according to claim 1, wherein
- the phase corrector calculates the corrected phase by performing feedback control so that the phase detection error of the phase detector calculated using the voltage command, the DC currents, and the impedance of the reactor becomes zero.

4. The control device for the converter according to claim 1, wherein
- the estimator estimates the inductance according to a state estimation observer to which the voltage command and the DC currents are input based on the voltage equation of the converter.

5. The control device for the converter according to claim 1, wherein
- the current controller updates the current control gain in stages using the inductance estimated by the estimator.

6. The control device for the converter according to claim 1, wherein
- the current controller continuously updates the current control gain using the inductance estimated by the estimator.

7. The control device for the converter according to claim 1, wherein when an abnormality is determined by monitoring the inductance estimated by the estimator, the current controller does not update the current control gain.

8. The control device for the converter according to claim 1, wherein when an abnormality is determined by monitoring a correction value of the phase detection error calculated by the phase corrector, the phase corrector does not correct a phase detected by the phase detector and the estimator does not estimate the inductance.

\* \* \* \* \*